3,244,683
POLYMERIZATION OF 2,2,4-TRIMETHYL-1,2-DIHYDROQUINOLINE
Richard H. Kline, Stow, Ohio, assignor to The Goodyear Tire & Rubber Company, Akron, Ohio, a corporation of Ohio
No Drawing. Filed Jan. 17, 1963, Ser. No. 252,064
6 Claims. (Cl. 260—88.3)

This invention relates to an improved process for the production of chemical compositions. More particularly it relates to an improved process of polymerizing 2,2,4-trimethyl-1,2-dihydroquinoline to produce a polymerized product which has a number of known and potential uses.

The polymerized product resulting from the polymerization of 2,2,4-trimethyl-1,2-dihydroquinoline has been previously known to be an effective antioxidant for rubber. The preparation of 2,2,4-trimethyl-1,2-dihydroquinoline may be conveniently carried out by reacting aniline with acetone at elevated temperatures and in the presence of a suitable catalyst such as iodine, toluene sulfonic acid, cresol sulfonic acid, phenol sulfonic acid, etc. Various detailed processes employing a number of different catalysts have been employed in the past to polymerize this monomeric quinoline. Among the polymerization catalysts that have been employed are aqueous solutions of the polyvalent metal halide salts. Under the most favorable conditions these previously known catalysts might result in sixty some percent of the 2,2,4-trimethyl-1,2-dihydroquinoline being converted into a polymerized form after a very long reaction time amounting to forty or more hours. Other previously known polymerization catalysts have included dilute hydrochloric acid. This catalyst system must be used in a carefully controlled concentration if unwieldy viscous reaction masses are to be avoided, and even if the consistency of the reaction mixture can be controlled and handled this acidic catalyst system requires special and expensive corrosion-resistant equipment to withstand the corrosive action of the acidic catalyst. Obviously the relatively low conversion of the monomeric dihydroquinoline to the polymerized material which is obtained only after a very extended reaction time and the corrosive unwieldy reaction masses make these prior art processes unattractive for the commercial production of the polymerized product.

It is an object of this invention to provide an improved process for producing rubber antioxidants. Another object of this invention is to provide an improved process for polymerizing 2,2,4-trimethyl-1,2-dihydroquinoline. A further object of this invention is to provide an improved polymerization catalyst system for catalyzing the polymerization of 2,2,4-trimethyl-1,2-dihydroquinoline, which will promote the polymerization of a high yield of polymerized product in a relatively short period of time.

In accordance with the present invention I have found that the foregoing and additional objects can be accomplished by conducting the polymerization of 2,2,4-trimethyl-1,2-dihydroquinoline at a temperature of from 80 to 140° C. in the presence of a catalytic amount of anhydrous aluminum chloride. In the commercial production of polymerized 2,2,4-trimethyl-1,2-dihydroquinoline it will generally be found preferable to conduct the polymerization at a temperature between 100 and 110° C. The anhydrous aluminum chloride may be added as a powdered solid directly to the monomer or it may first be dispersed in an inert organic solvent such as toluene, benzene, xylene or n-heptane, etc. I have found that the polymerization reaction proceeds more rapidly if the anhydrous aluminum chloride is added directly to the monomer. However, the employment of a suitable inert solvent in which the catalyst may be dispersed is frequently found to be preferred since it permits the reaction mixture to be more readily and uniformly stirred. After the polymerization reaction is completed the catalyst is neutralized by introducing an aqueous solution of a suitable basic material such as sodium or potassium hydroxide. The lower aqueous layer is then separated and discarded. If an organic solvent has been employed to disperse the anhydrous catalyst it is then stripped off along with any unreacted monomer by heating the reaction mixture to an elevated temperature and preferably at reduced pressure. The polymerized product may then be poured from the reaction vessel and allowed to cool, becoming a clear brown resin which can be readily pulverized for easy incorporation into rubber formulations. The catalyzed polymerization of 2,2,4-trimethyl-1,2-dihydroquinoline can be carried out employing either the pure material or the crude reaction product resulting from the reaction of aniline and acetone. From a commercial point of view the crude reaction product is a preferred starting material since it may be polymerized without removing the iodine or other condensation catalyst.

The anhydrous aluminum chloride used to catalyze the polymerization of 2,2,4-trimethyl-1,2-dihydroquinoline in accordance with the present invention is to be employed in conventional catalytic amounts ranging from 2.0 to 10.0 percent by weight based on the weight of the monomeric dihydroquinoline to be polymerized. Preferred proportions of the catalyst will normally range from 6.0 to 8.0 percent by weight based on the weight of the monomeric dihydroquinoline to be polymerized.

The following examples are illustrative of the highly improved process of this invention for polymerizing 2,2,4-trimethyl-1,2-dihydroquinoline.

EXAMPLE 1

Using distilled 2,2,4-trimethyl-1,2-dihydroquinoline—no solvent

One hundred grams of distilled 2,2,4-trimethyl-1,2-dihydroquinoline and eight grams of anhydrous aluminum chloride were heated at 105° C. for 30 minutes during which time the mixture became quite thick. Benzene (100 ml.) was then added and the aluminum chloride was neutralized by the addition of a solution of 20 grams of sodium hydroxide in 100 ml. of water. The lower aqueous layer was separated and discarded. The organic layer was heated to 150° C. at atmospheric pressure to remove the benzene. The residue was then distilled under vacuum to separate unreacted 2,2,4-trimethyl-1,2-dihydroquinoline. Twenty one grams were collected at 140–150° C./24 mm. The residue was a clear red-brown resin melting at 88–105° C., weight 79 grams.

EXAMPLE 2

Using distilled 2,2,4-trimethyl-1,2-dihydroquinoline—toluene solvent

One hundred grams of distilled 2,2,4-trimethyl-1,2-dihydroquinoline, eight grams of anhydrous aluminum chloride and 75 ml. of toluene were heated at 100–110° C. for four hours. The aluminum chloride catalyst was then neutralized by adding, at 80° C., a solution of 18 grams sodium hydroxide in 75 ml. of water. The lower aqueous layer was separated and discarded. Toluene was removed from the reaction mixture by heating to 120° C./25 mm. Unreacted 2,2,4-trimethyl-1,2-dihydroquinoline was distilled off at 130–136° C./15 mm. Fifteen and one half grams of the monomer were obtained. The red-brown resinous product, which melted at 86–95° C., weighed 80 grams.

EXAMPLE 3

*Using crude 2,2,4-trimethyl-1,2-dihydroquinoline—toluene solvent*

Two hundred and eighty five grams of crude 2,2,4-trimethyl-1,2-dihydroquinoline (the reaction product obtained from the p-toluene sulfonic acid catalyzed condensation of aniline and acetone), including 3.5 percent catalyst residue, were dissolved in 200 ml. toluene. Twenty grams of anhydrous aluminum chloride were added and the mixture was heated at 100–110° C. for four hours. A solution of 40 grams of sodium hydroxide in 160 ml. of water was added to neutralize the catalyst. The lower aqueous layer was separated and discarded. Toluene was removed by heating the reaction mixture to 125° C./12 mm. Unreacted 2,2,4-trimethyl-1,2-dihydroquinoline (57.5 grams) was recovered by vacuum distillation at 125–132° C./9 mm. A yield of 217.5 grams of red-brown resin was obtained. This product melted at 87–97° C.

The effect of water on the ability of aluminum chloride to catalyze the polymerization of 2,2,4-trimethyl-1,2-dihydroquinoline was studied by conducting a series of tests following the procedure described in Example 2 above. The results obtained are summarized in the following table.

TABLE I

| Run No. | Aluminum Chloride Employed | | Water Present During Polymerization | | Percent Yield |
|---|---|---|---|---|---|
| | Weight, grams | No. of Equivalents | Weight, grams | No. of Equivalents | |
| 1 | 8 | 0.18 | 0.0 | 0.0 | 81.0 |
| 2 | 8 | 0.18 | 1.62 | 0.09 | 69.5 |
| 3 | 4 | 0.09 | 0.0 | 0.0 | 69.0 |
| 4 | 8 | 0.18 | 3.25 | 0.18 | 42.5 |

A consideration of the above data shows that even a very minor amount of water (Run No. 2, which contains sufficient water to result in only 50% hydrolysis of the catalyst) has a deleterious effect on the yield of polymer formed. Run No. 4, which contained sufficient water to permit complete hydrolysis of the aluminum chloride, resulted in a still lower yield of polymer. The extreme sensitivity of the polymerization reaction to water may be more fully appreciated by a further consideration of Run No. 2, which contains 1.62 grams of water, representing only 0.9% of the total weight of the reaction mixture, yet this small amount of water had a definite adverse effect on the polymerization reaction.

The effectiveness of polymerized 2,2,4-trimethyl-1,2-dihydroquinoline prepared in accordance with the present invention to stabilize rubbers against degradation caused by oxygen is demonstrated by the following test. Samples of the polymerized products prepared in accordance with Examples 1 and 2 were used to stabilize natural rubber in accordance with the procedure described in the following example.

EXAMPLE 4

Three samples of the following rubber formulation were prepared, one sample (A) contained no stabilizer, a second sample (B) contained 1.0 part of the polymerized product of Example 1, a third sample (C) contained 1.0 part of the polymerized product of Example 2. In these formulations all proportions are expressed as parts by weight per 100 parts by weight of rubber.

| | Sample (A) | Sample (B) | Sample (C) |
|---|---|---|---|
| Smoked sheet | 100 | 100 | 100 |
| Carbon black | 50 | 50 | 50 |
| Pine tar | 3 | 3 | 3 |
| Stearic acid | 3 | 3 | 3 |
| Surfur | 2.75 | 2.75 | 2.75 |
| Zinc oxide | 5 | 5 | 5 |
| N-nitrosodiphenylamine | 0.5 | 0.5 | 0.5 |
| NOBS #1 [1] | 0.45 | 0.45 | 0.45 |
| Polymerized product of Example (1) | 0 | 1.0 | 0 |
| Polymerized product of Example (2) | 0 | 0 | 1.0 |

[1] NOBS #1 is a commercial accelerator containing 90% N-oxydiethylene-2-benzothiazole sulfenamide and 10% di-2-benzothiazyl disulfide.

All three of the above stocks were cured for 60 minutes at 280 F. The oxidation resistance of these three rubber samples was evaluated by subjecting them to creep measurement tests in accordance with the procedure outlined in the article entitled "Evaluation of Commercial GR–S Vulcanizates by a Creep Test"; Industrial and Engineering Chemistry, vol. 47, page 165, January 1955. The tests in this series were conducted at 110° C. The time required for 50% elongation is shown in the following table.

TABLE II

| | Antioxidant | Hours to 50% Elongation |
|---|---|---|
| Sample A | None (control) | 8.4 |
| Sample B | 1.0 part of product of Example 1 | 28.8 |
| Sample C | 1.0 part of product of Example 2 | 27.8 |

The rubbers which may be conveniently protected by polymerized 2,2,4-trimethyl-1,2-dihydroquinoline produced in accordance with this invention are natural rubber and those synthetic oxidizable diene rubbers which are normally susceptible to deterioration by sunlight and atmospheric oxygen. By the term "oxidizable diene rubbers" is meant natural rubber and the synthetic rubbery polymers and copolymers of conjugated dienes. Representative examples of synthetic oxidizable diene rubbers which are normally susceptible to deterioration by sunlight and atmospheric oxygen include polychloroprene; polyisoprene having essentially all of its units combined in a cis-1,4 structure; polybutadiene having essentially all of its units combined in a cis-1,4 structure; the rubbery copolymers of butadiene and styrene which may contain from 50 to 90% or more of butadiene; and butyl rubber which is a polymerization product of a major proportion of a mono olefin and a minor proportion of a multiolefin such as butadiene or isoprene.

While certain representative embodiments and details have been shown for the purpose of illustrating the invention it will be apparent to those skilled in this art that various changes and modifications may be made therein without departing from the spirit or scope of the invention as defined in the appended claims.

I claim:

1. A process for the production of rubber antioxidants which consists in polymerizing 2,2,4-trimethyl-1,2-dihydroquinoline in the presence of a catalytic amount of anhydrous aluminum chloride, said polymerization being conducted at a temperature between 80 and 140° C.

2. A process for the production of rubber antioxidants which consists in polymerizing 2,2,4-trimethyl-1,2-dihydroquinoline in the presence of from 2.0 to 10.0 percent by weight of anhydrous aluminum chloride based on the weight of 2,2,4-trimethyl-1,2-dihydroquinoline employed, said polymerization being conducted at a temperature between 80 and 140° C.

3. A process for the production of rubber antioxidants which consists in polymerizing 2,2,4-trimethyl-1,2-dihydroquinoline at a temperature between 80 and 140° C.

in the presence of from 2.0 to 10.0 percent by weight of anhydrous aluminum chloride based on the weight of the reactants.

4. A process for the production of rubber antioxidants which consists in polymerizing 2,2,4-trimethyl-1,2-dihydroquinoline in the presence of from 2.0 to 10.0 percent by weight based on the total weight of the reactants of anhydrous aluminum chloride dispersed in an inert organic solvent, said polymerization being conducted at a temperature between 80 and 140° C.

5. In the process which consists in polymerizing 2,2,4-trimethyl-1,2-dihydroquinoline the improvement wherein the polymerization is conducted in the presence of a catalytic amount of anhydrous aluminum chloride, said polymerization being conducted at a temperature between 80 and 140° C.

6. In the process which consists in polymerizing 2,2,4-trimethyl-1,2-dihydroquinoline the improvement wherein the polymerization is conducted in the presence of a catalytic amount of anhydrous aluminum chloride dispersed in an inert organic solvent, said polymerization being conducted at a temperature between 80 and 140° C.

References Cited by the Examiner
UNITED STATES PATENTS

| | | | |
|---|---|---|---|
| 2,064,752 | 12/1936 | Ingram | 260—88.3 |
| 2,290,561 | 7/1942 | Ingram | 260—88.3 |
| 2,664,407 | 12/1953 | Ingram | 260—88.3 |
| 3,047,521 | 7/1962 | Harman | 260—88.3 |

FOREIGN PATENTS 363,582  11/1922  Germany.

SAMUEL H. BLECH, *Primary Examiner.*

MURRAY TILLMAN, *Examiner.*